United States Patent
Baldwin

(10) Patent No.: US 10,889,744 B2
(45) Date of Patent: Jan. 12, 2021

(54) CLARIFICATION OF COLLOIDAL SUSPENSIONS

(71) Applicant: SIGNET AGGREGATES, LLC, Casper, WY (US)

(72) Inventor: Robert Delane Baldwin, Casper, WY (US)

(73) Assignee: SIGNET AGGREGATES, LLC, Casper, WY (US)

(*) Notice: Subject to any disclaimer, the term of this patent is extended or adjusted under 35 U.S.C. 154(b) by 6 days.

(21) Appl. No.: 16/396,477

(22) Filed: Apr. 26, 2019

(65) Prior Publication Data

US 2020/0339860 A1    Oct. 29, 2020

(51) Int. Cl.
*C09K 8/32* (2006.01)
*B01D 33/00* (2006.01)
*B01D 33/35* (2006.01)

(52) U.S. Cl.
CPC ............ *C09K 8/32* (2013.01); *B01D 33/0035* (2013.01)

(58) Field of Classification Search
None
See application file for complete search history.

(56) References Cited

U.S. PATENT DOCUMENTS

| 269,742 A | 12/1882 | Taggart |
| 1,948,609 A | 2/1934 | Andrews et al. |
| 2,175,457 A | 10/1939 | Dunn |
| 2,562,024 A | 7/1951 | Dunn et al. |
| 2,766,496 A | 10/1956 | Ward |
| 2,846,150 A | 8/1958 | Work |
| 3,087,710 A * | 4/1963 | Dujardin ............... B03D 1/004 261/18.1 |
| 3,162,381 A | 12/1964 | Cohn et al. |
| 3,519,403 A | 7/1970 | Horst et al. |
| 3,559,895 A | 2/1971 | Fay |

(Continued)

FOREIGN PATENT DOCUMENTS

| EP | 0574175 A1 | 12/1993 |
| JP | H111319618 A | 11/1999 |

(Continued)

OTHER PUBLICATIONS

Extended European Search Report for European Patent Application No. 12832482.9, dated Jun. 9, 2015, 6 pages.

(Continued)

*Primary Examiner* — Jeffrey D Washville
(74) *Attorney, Agent, or Firm* — Innovation Capital Law Group, LLP; Vic Lin

(57) ABSTRACT

A process mechanically breaks colloidal suspension bonds with the surrounding fluids through high energy impact with a stationary plate or a colliding fluid stream. The fluid with a colloidal suspension is pumped through one or more 1/8" to 3" nozzles to collide with either a stationary plate in an impact chamber at high velocity, or another similar or different fluid stream. The process breaks the bonds maintaining the colloidal suspension, disassociates these materials, and allows for gravity or chemical separation of the previously colloidal particles from the fluid. The process can separate colloidal particles from a liquid medium through pressurization followed by high energy impact and rapid release.

20 Claims, 3 Drawing Sheets

(56) References Cited

U.S. PATENT DOCUMENTS

| | | |
|---|---|---|
| 3,876,156 A | 4/1975 | Muschelknautz et al. |
| 4,002,462 A | 1/1977 | Maddox |
| 4,283,015 A | 8/1981 | Smith |
| 4,563,271 A | 1/1986 | Schroder et al. |
| 4,569,696 A | 2/1986 | Sandstrom et al. |
| 4,861,349 A | 8/1989 | Bublik et al. |
| 4,940,187 A | 7/1990 | Lee |
| 5,316,751 A | 5/1994 | Kingsley et al. |
| 5,346,532 A | 9/1994 | Sinclair et al. |
| 5,562,253 A | 10/1996 | Henderson et al. |
| 5,716,751 A | 2/1998 | Bertrand et al. |
| 5,732,893 A | 3/1998 | Nied |
| 5,765,766 A | 6/1998 | Yoshida et al. |
| 6,082,640 A | 7/2000 | Edlinger |
| 6,138,931 A | 10/2000 | Geurts et al. |
| 6,691,938 B2 | 2/2004 | Bradshaw |
| 6,708,909 B2 | 3/2004 | Toda et al. |
| 6,712,215 B2 | 3/2004 | Scheybeler |
| 6,971,594 B1 | 12/2005 | Polifka |
| 7,278,595 B2 | 10/2007 | Itoh et al. |
| 7,416,671 B2 | 8/2008 | Bozak et al. |
| 8,777,139 B2 | 7/2014 | Yagome |
| 2002/0054995 A1 | 5/2002 | Mazurkiewicz |
| 2002/0182981 A1 | 12/2002 | Bradshaw |
| 2004/0016834 A1 | 1/2004 | Casalmir et al. |
| 2006/0032953 A1 | 2/2006 | Kruse |
| 2006/0086835 A1 | 4/2006 | Nyssen et al. |
| 2009/0314864 A1 | 12/2009 | Kruse |
| 2010/0193618 A1 | 8/2010 | Lewis-Gray |
| 2011/0009590 A1 | 1/2011 | Matsumoto et al. |
| 2013/0068863 A1 | 3/2013 | Coates et al. |
| 2013/0126426 A1 | 5/2013 | Jones et al. |
| 2014/0069821 A1 | 3/2014 | Marcin et al. |
| 2014/0137901 A1 | 5/2014 | Coates et al. |

FOREIGN PATENT DOCUMENTS

| | | |
|---|---|---|
| JP | 2002153769 | 5/2002 |
| JP | 2002320947 A | 11/2002 |
| JP | 2006198530 A | 8/2006 |
| WO | 8501884 A1 | 5/1985 |
| WO | 0115823 A1 | 3/2001 |

OTHER PUBLICATIONS

Harshman, E.N., "Geology and Uranium Deposits, Shirley Basin Area, Wyoming," Geological Survey Professional Paper 745, U.S. Govt. Printing Office, Washington, 1972, 91 pages.

International Search Report for International Application No. PCT/US2014/011529, dated Sep. 1, 2014.

Krumhansl et al., "Inherently Safe In Situ Uranium Recovery," Sandia Report, SAND2008-6688, Sandia National Laboratories, May 2009, pp. 1-18.

Lide, David R. Ed., "Hardness of Minerals and Ceramics," CRC Handbook of Chemistry and Physics, 81st Edition, CRC Press, 2000-2001, p. 12-211.

Merriam-Webster, definition of "heterogeneous," located at http://www.merriam-webster.com/dictionary/heterogeneous. Accessed on Jul. 25, 2013.

Merriam-Webster, definition of "homogeneous," located at http://www.merriam-webster.com/dictionary/homogeneous. Accessed on Jul. 25, 2013.

Merriam-Webster, definition of "Mineral," located at http://www.merriam-webster.com/dictionary/mineral. Accessed on Aug. 2, 2013.

Minerals Education Coalition, "If It Can't Be Grown, It must Be Mined," located at http://www.mineralseducationcoalition.org/minerals/mica. Accessed on Aug. 2, 2013.

PCT International Search Report dated Jan. 17, 2018 from PCT Application No. PCT/US2017/060676.

PCT International Search Report for International Application No. PCT/US2012/055157, dated Feb. 26, 2013.

Vine et al., "Geology and Uranium Occurrences in the Miller Hill Area Carbon County Wyoming," Geological Survey Bulletin 1074-F, U.S. Govt. Printing Office, Washington, 1959, 50 pages.

* cited by examiner

CLARIFICATION OF COLLOIDAL SUSPENSIONS

BACKGROUND OF THE INVENTION

1. Field of the Invention

Embodiments of the invention relates generally to liquid purification methods and apparatus. More particularly, the invention relates to methods and apparatus for the clarification of colloidal suspensions.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Colloidal suspensions render many fluids unusable as the colloidal materials change the properties of the host fluid substantially. Cooking oils, motor oils, hydraulic oils, drilling muds, mine tailings ponds and other fluids become unusable as colloidal suspensions develop within them. Re-use of the fluids may become impractical or disposal may become difficult, as in the case of many mine tailing ponds.

Conventional methods for the clarification of colloidal suspensions include (1) mechanical centrifugal separation, where the use of centrifuges overcome capillary and adhesive forces between the fluid and the colloidal particles; (2) mechanical filtration systems where some particles are filtered out but are often require large filters and the filters often become plugged; (3) evaporation ponds; (4) chemical methods where chemicals are used to separate solids from their host fluid using flocculants which can, however, present further contamination and remediation challenges; and (5) thermal separation where boiling of fluids leaves a "reduction" that contains the colloidal and other solids, but is often impractical.

These conventional methods can take substantial time and often incur more expense. Prior methods often result in environmentally damaging byproducts or an unsafe work environment. Prior methods are cost limiting or prohibitive.

In view of the foregoing, there is a need for improved methods and apparatus for the clarification of colloidal suspensions.

SUMMARY OF THE INVENTION

Embodiments of the present invention provide a method for clarifying a colloidal suspension comprising impacting the colloidal suspension with one of an impact wall and one or more additional fluids to form an impacted colloidal suspension; collecting the impacted colloidal suspension; and separating a clarified fluid fraction from the collected impacted colloidal suspension.

Embodiments of the present invention further provide a method for clarifying a colloidal suspension comprising pumping the colloidal suspension through at least one nozzle to create a pressurized colloidal suspension; releasing the pressurized colloidal suspension from the at least one nozzle to create at least one stream of fluid; impacting the at least one stream of fluid with one of an impact wall and one or more additional streams of fluid to form an impacted colloidal suspension; collecting the impacted colloidal suspension; and separating a clarified fluid from the collected impacted colloidal suspension.

Embodiments of the present invention also provide a method for reducing a total suspended solids concentration of a fluid comprising impacting the colloidal suspension having a first total suspended solids concentration with one of an impact wall and one or more additional fluids to form an impacted colloidal suspension; collecting the impacted colloidal suspension; and separating a clarified fluid fraction from the collected impacted colloidal suspension, wherein the clarified fluid fraction has a second total suspended solids concentration less than the first total suspended solids concentration.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
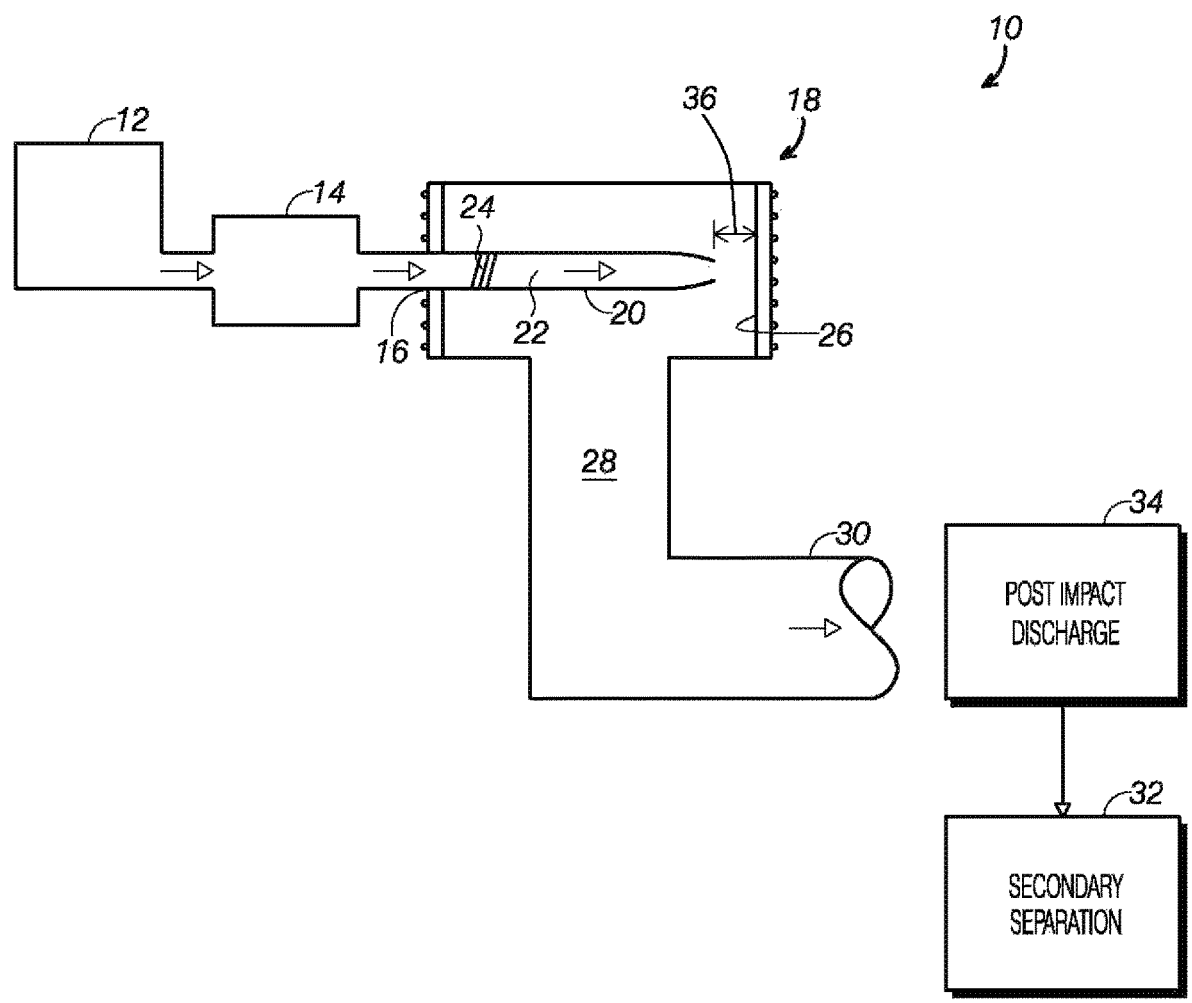
FIG. 1 illustrates a schematic representation of an apparatus usable to perform methods according to an exemplary embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide an apparatus and process to mechanically break colloidal suspension bonds with the surrounding fluids through high energy impact with a stationary plate or colliding fluid stream. The fluid with a colloidal suspension is pumped through one or more $\frac{1}{8}$" to 3" nozzles to collide with either a stationary plate in an impact chamber at high velocity, or another similar or different fluid stream. The process breaks the bonds maintaining the colloidal suspension, disassociates these materials, and allows for gravity or chemical separation of the previously colloidal particles from the fluid. The process can separate colloidal particles from a liquid medium through pressurization followed by high energy impact and rapid release.

Typically, a fluid with a colloidal suspension is pumped through one or more nozzles into either a stationary high impact plate, or against another high rate fluid stream within a chamber. Typically, this other high rate fluid stream can be the same fluid with a colloidal suspension therein, however, in some embodiments, this other high rate fluid stream may be a different liquid, such as water, and, in other embodiments, this other high rate fluid stream may be an air stream. When pressure is released, the fluids clarify through gravity separation and some of the fluid volume is clarified of the colloidal mixture. Other clarifying processes could also be used after the high energy impact or collision.

The separation of the colloidal solid from the host liquid, whether sand particles, drill cuttings, or other dust like solid, must overcome the surface tension forces that have come to dominate the movement of the colloidal solid, rendering gravity negligible. These bonds have never yet been broken in such an efficient way by harnessing fluid flow characteristics and inertia. This breakage of such bonds through this high rate and high impact action is novel and unexpected in a pressure and release scenario such as that harnessed and created by embodiments of the present invention. Impact separation combined with rapid pressure release can provide adequate energy to overcome the aforementioned forces.

Water based drilling mud can pumped through the apparatus described below and then be allowed to gravity separate, sometimes with the addition of a surfactant and sometimes free from any surfactant. Typical initial processing results can reduce colloidal suspensions by ten to twenty five percent, leaving clarified liquids and muds with higher total solid concentrations. Subsequent identical processing operations continue to decrease colloidal suspensions.

Referring now to FIG. 1, an apparatus 10 can receive a colloidal suspension into a tank 12. This suspension may be pumped, via one or more pumps 14 into an impact chamber 18 and can exit, via a nozzle 20 to strike an impact plate 26. The impacted fluid 34 may exit through an opening 28 in the bottom of the impact chamber 18 and a channel 28 may be located beneath the opening 28 to allow the resulting impacted fluid 34, also referred to as post impact discharge 34, to flow to a secondary separation phase 32, which can include, for example, gravity or chemical separation. In some embodiments, the impacted fluid 34 may be re-introduced into the tank 12 for further impact on the impact plate 26.

The nozzle 20 may have a threaded region 22 that may mate with a threaded region 24 on the output tube 16 from the slurry pump 14. Threaded region 22 may be, for example, a female threaded region and threaded region 24 may be a male threaded region, however, the threads may be reversed within the scope of the present invention. The threaded regions 22, 24 allow the user to easily change the nozzle 20 to a desired diameter and distance 36 away from the impact plate 26, depending on the input colloidal suspension, the desired output, input rate, liquid concentration in the suspension, pump rate, and the like.

In some embodiments, the nozzle 20 may be formed from a 2-inch pipe that narrows to 1.5 inches at its end. The impact chamber 18 may be formed from a 6-inch pipe with the impact plate 26 disposed at a closed end thereof. The end of the nozzle 20 may be disposed a distance 36 from about 1 inch to about 6 inches, typically from about 2 inches to about 4 inches, from the impact plate 26. Of course, the sizes of each component (such as the nozzle 20 and the impact chamber 18) and the distance between the nozzle 20 and the impact plate 26 may vary depending on the particular application.

Figure 2:
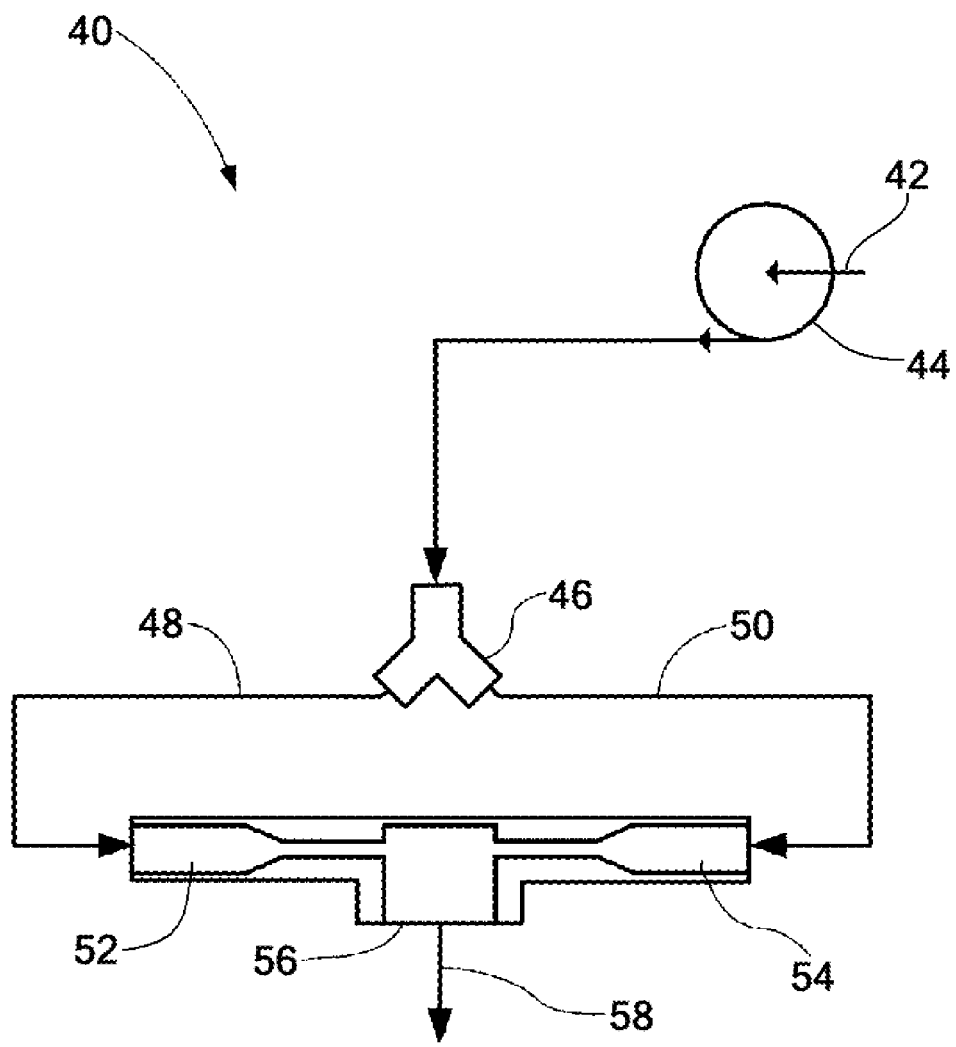
FIG. 2 illustrates a schematic representation of another apparatus usable to perform methods according to an exemplary embodiment of the present invention.

Referring now to FIG. 2, in some embodiments, the colloidal suspension may be impacted by directing two or more streams of the colloidal suspension at each other. An apparatus 40 can include a pump 44 to direct an input fluid 42, such as a colloidal suspension, to a splitter 46 that directs the pumped fluid into feed lines 48, 50. The feed lines 48, 50 direct the pumped fluid into nozzles 52, 54, respectively. The nozzles 52, 54 are directed at each other to cause pressurized fluid from the feed lines 48, 50 to impact each other in an impact chamber 56. The output 58 may be treated, by chemical or gravity separation, for example, to separate out the suspended particles from the liquid.

While the figure shows the nozzles 52, 54 aiming their output streams directly at each other, in some embodiments the output streams of the nozzles 52, 54 may be angled, either horizontally, vertically, or both horizontally and vertically, provided that at least a portion of one nozzle output stream impacts another. Further, while only two nozzles are shown, more than two nozzles may be used, provided that at least a portion of one nozzle output stream impacts another. In other embodiments, two or more nozzles may direct their output streams at each other, while one or more additional nozzles may direct their output at a fixed plate, similar to that described above with respect to FIG. 1.

Figure 3:
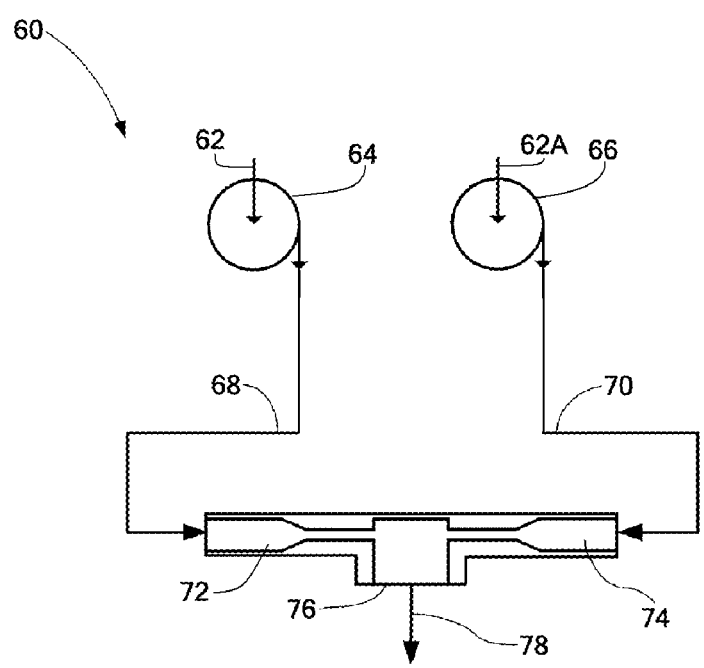
FIG. 3 illustrates a schematic representation of another apparatus usable to perform methods according to an exemplary embodiment of the present invention.

Referring now to FIG. 3, in some embodiments, the colloidal suspension may be impacted by directing two or more streams of the colloidal suspension at each other. An apparatus 60 can include two or more pumps 44, 46 (two are shown in FIG. 3) to direct an input fluid 62, 62A, such as a colloidal suspension, to feed lines 68, 70. The feed lines 68, 70 direct the pumped fluid into nozzles 72, 74, respectively. The nozzles 72, 74 are directed at each other to cause pressurized fluid from the feed lines 68, 70 to impact each other in an impact chamber 76. The output 78 may be treated, by chemical or gravity separation, for example, to separate out the suspended particles from the liquid. The embodiment of FIG. 3 may be used when the input fluids 62, 62A are the same or different. In some embodiments, one pump 64 may be removed and pressurized air may be used as the input fluid 62.

While the figure shows the nozzles 72, 74 aiming their output streams directly at each other, in some embodiments the output streams of the nozzles 72, 74 may be angled, either horizontally, vertically, or both horizontally and vertically, provided that at least a portion of one nozzle output stream impacts another. Further, while only two nozzles are shown, more than two nozzles may be used, provided that at least a portion of one nozzle output stream impacts another. In other embodiments, two or more nozzles may direct their output streams at each other, while one or more additional nozzles may direct their output at a fixed plate, similar to that described above with respect to FIG. 1.

EXAMPLE

A colloidal suspension was taken from standard water based oilfield drilling mud. Attempts by the operator prior to collection to clarify and reuse this fluid on repeated drilling operations have left it with colloidal suspensions that the operator was not able to remove, and these colloidal suspensions make the fluid unusable by density and other measures.

The fluids contained total suspended solids of 129,000 mg/L. This fluid was processed through the devices described above at 80 psi with a variety of configurations, including, but not limited to passing through a 1¼" nozzle to a fixed plate, and passing through multiple 1¼" nozzles whose flow was directed at each other as per the device specifications. The resulting post processing product was allowed to settle and to vertically gravity separate for approximately 24 hours.

Samples were taken from the processed fluids at approximately 6", 18", 30", and 40" of depth from a container 42" in depth. Those samples showed total suspended solids (TSS) levels of 7 mg/L, 57,500 mg/L, 127,000 mg/L, and 166,000 mg/L, respectively.

Clearly, the processing of the colloidal suspension according to processes of the present invention results in the ability to gravity separate a clarified fluid from the colloidal suspension that may be re-used, while the remaining waste product is minimized. In some embodiments, the clarified fluid has a total dissolved solid concentration of at least 25 percent less than the initial colloidal suspension and, in some embodiments, at least 50 percent less total dissolved solids.

The processes according to embodiments of the present invention were developed for clarification of oil field muds and mine tailings piles but could easily clarify used motor oils, cooking oils or the like. Water based cuttings are a challenge to remediate on a rig site and tailings ponds present a risk to many downstream villages worldwide. While considering these problems, the methods of the present invention were devised for clarification of such fluids.

These processes can be used with varying input fluid rates, solid particle sizes, and nozzle sizes to optimize the colloidal contaminant removal. Temperature variations could increase component separation. The stationary impact plate and impact chamber could be optimized per input material such as by modifying the impact angle, impact plate design, or distance of the impact plate from the nozzle. The colliding fluid streams could be optimized by varying the impact angle, the distance of separation of the nozzles, and the number of nozzles and fluid streams. Secondary contaminant and media separation (after the high energy impact) may vary by input material. Variation in control and measurement of each item listed above can modify the process improvement and optimization. Surfactants or other chemicals modifying the contact angle of the bonds creating the colloidal suspension may enhance the clarification of the base fluids. Of course, the colloidal suspensions may be free from any surfactants or other added chemicals.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A method for clarifying a colloidal suspension, comprising:
    impacting the colloidal suspension with one of an impact wall and one or more additional fluids to form an impacted colloidal suspension;
    collecting the impacted colloidal suspension as a collected fluid; and
    separating a clarified fluid fraction from the collected impacted colloidal suspension, wherein
    the clarified fluid fraction is at an upper portion of the collected fluid and suspended solids settle at a lower portion of the collected fluid.

2. The method of claim 1, wherein the colloidal suspension is impacted against an impact wall.

3. The method of claim 1, wherein a first stream of the colloidal suspension is impacted against a second stream of the colloidal suspension.

4. The method of claim 1, wherein a first stream of the colloidal suspension is impacted against a second stream of a different fluid.

5. The method of claim 1, wherein the step of separating includes gravity separation.

6. The method of claim 1, wherein the colloidal suspension is oil drilling mud.

7. The method of claim 1, wherein the clarified fluid fraction is formed within about 24 hours.

8. The method of claim 7, wherein the clarified fluid has fewer total dissolved solids as compared with the colloidal suspension.

9. The method of claim 7, wherein the clarified fluid has at least 25 percent less total dissolved solids as compared with the colloidal suspension.

10. The method of claim 1, further comprising pumping the colloidal suspension through a nozzle to create a pressurized colloidal suspension.

11. The method of claim 10, further comprising releasing the pressurized colloidal suspension from the nozzle to release the pressure therefrom.

12. The method of claim 10, wherein a tip of the nozzle has a diameter smaller than the nozzle to create the pressurized colloidal suspension.

13. The method of claim 1, further comprising adding a surfactant to the colloidal suspension.

14. A method for clarifying a colloidal suspension, comprising:
    pumping the colloidal suspension through at least one nozzle to create a pressurized colloidal suspension;
    releasing the pressurized colloidal suspension from the at least one nozzle to create at least one stream of fluid;
    impacting the at least one stream of fluid with one of an impact wall and one or more additional streams of fluid to form an impacted colloidal suspension;
    collecting the impacted colloidal suspension; and
    separating a clarified fluid from the collected impacted colloidal suspension.

15. The method of claim 14, wherein the step of separating includes gravity separation.

16. The method of claim 14, wherein the clarified fluid is formed within about 24 hours.

17. The method of claim 16, wherein the clarified fluid has fewer total dissolved solids as compared with the colloidal suspension.

18. The method of claim 16, wherein the clarified fluid has at least 25 percent less total dissolved solids as compared with the colloidal suspension.

19. A method for reducing a total suspended solids concentration of a fluid, comprising:
    impacting the colloidal suspension having a first total suspended solids concentration with one of an impact wall and one or more additional fluids to form an impacted colloidal suspension;
    collecting the impacted colloidal suspension as a collected fluid; and
    separating a clarified fluid fraction from the collected fluid, wherein the clarified fluid fraction has a second total suspended solids concentration less than the first total suspended solids concentration, wherein
    the clarified fluid fraction is at an upper portion of the collected fluid and suspended solids settle at a lower portion of the collected fluid.

20. The method of claim 19, wherein the clarified fluid is formed within about 24 hours by gravity separation.

* * * * *